July 7, 1925. 1,544,623
V. G. APPLE
MACHINE FOR PRESSING INDUCTORS INTO PLACE ON THE CORE OF DYNAMO ELECTRIC
MACHINE ELEMENTS AND THEN BENDING THEM SIMULTANEOUSLY
Filed Nov. 6, 1922    10 Sheets-Sheet 2
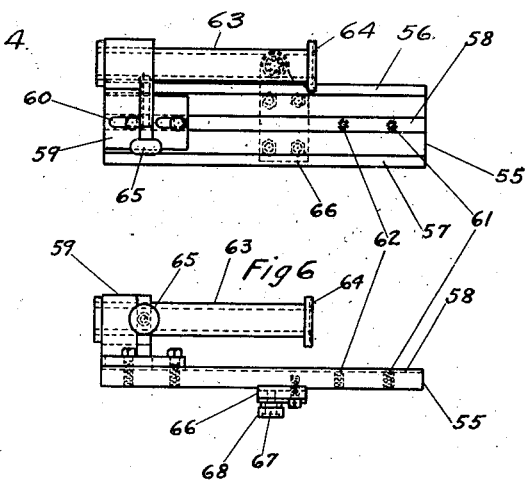
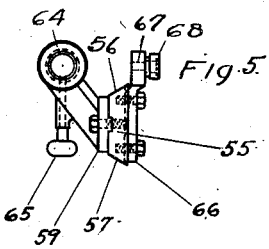
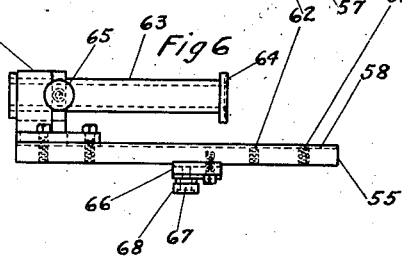
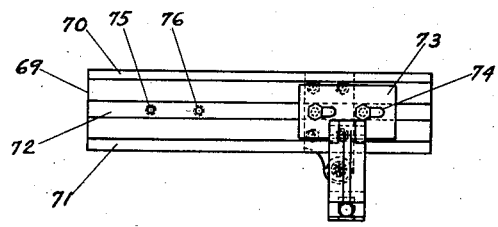
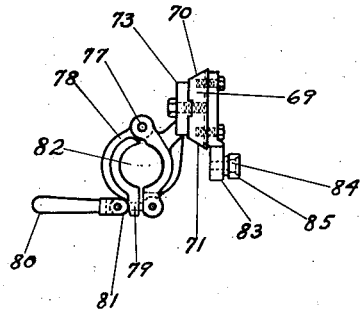
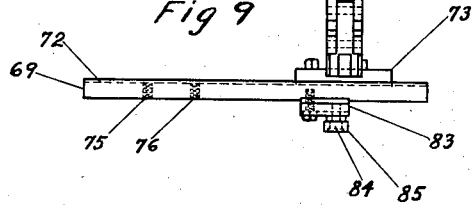
INVENTOR

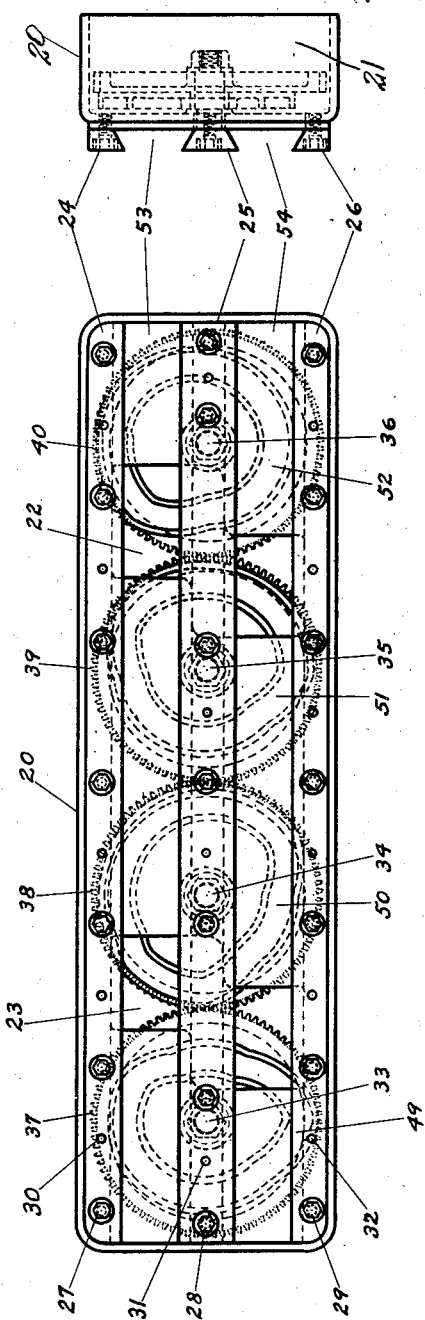

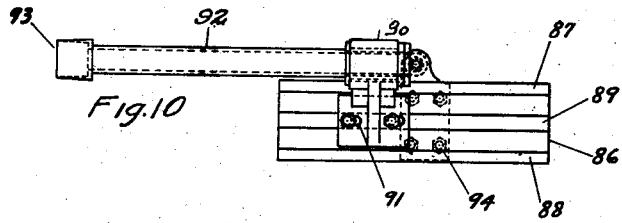
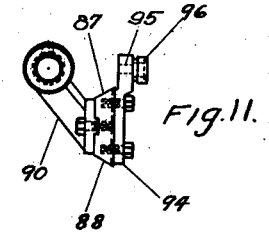
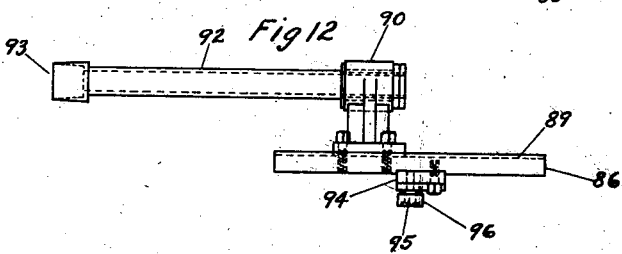
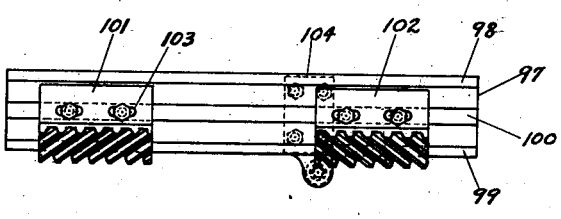
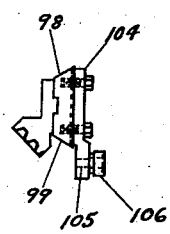
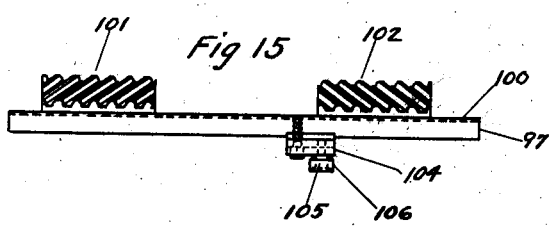

July 7, 1925. 1,544,623
V. G. APPLE
MACHINE FOR PRESSING INDUCTORS INTO PLACE ON THE CORE OF DYNAMO ELECTRIC
MACHINE ELEMENTS AND THEN BENDING THEM SIMULTANEOUSLY
Filed Nov. 6, 1922 10 Sheets-Sheet 4
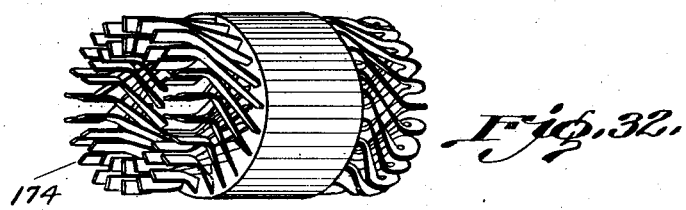
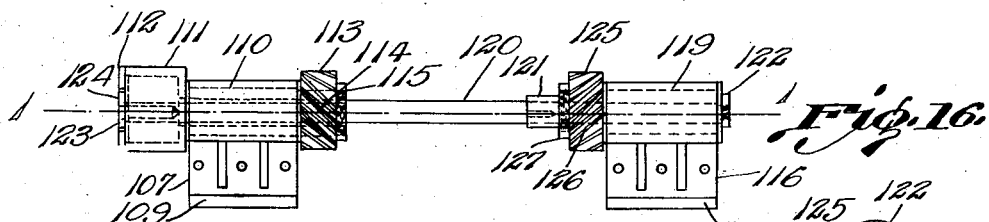
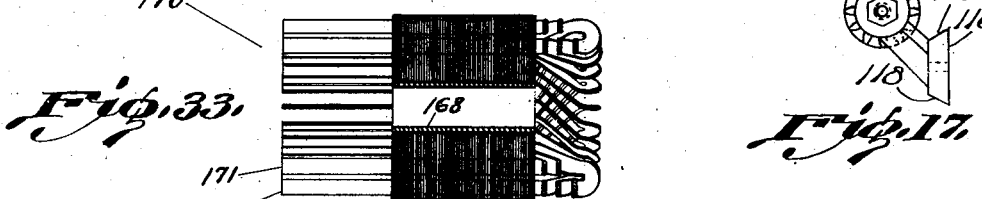
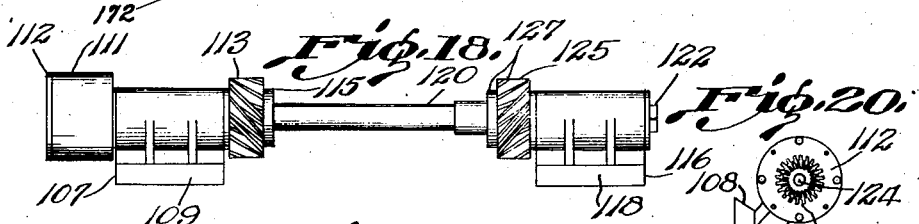
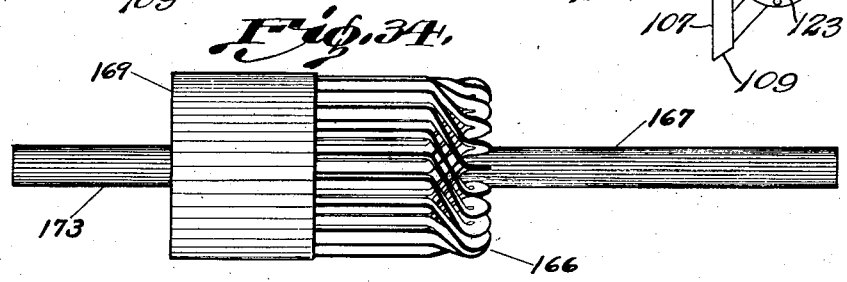
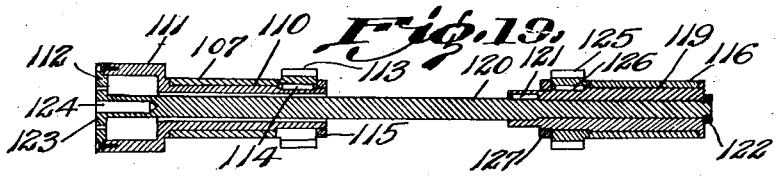
INVENTOR

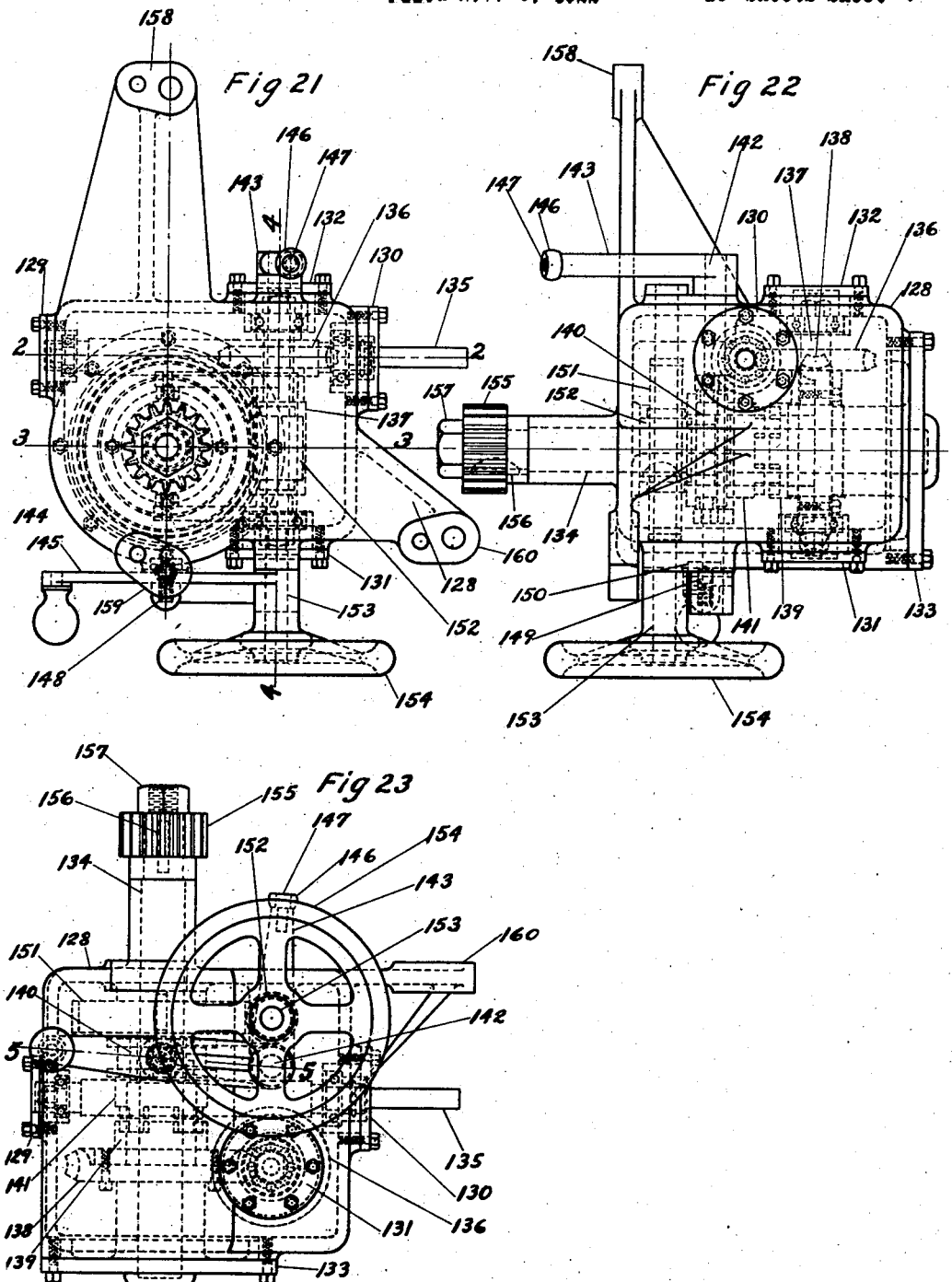

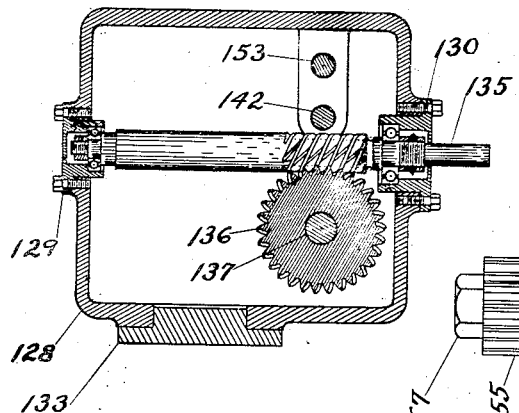
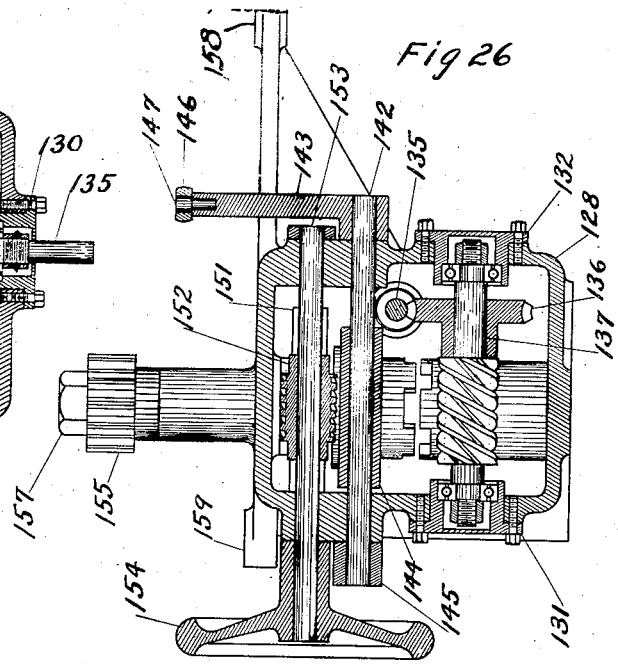
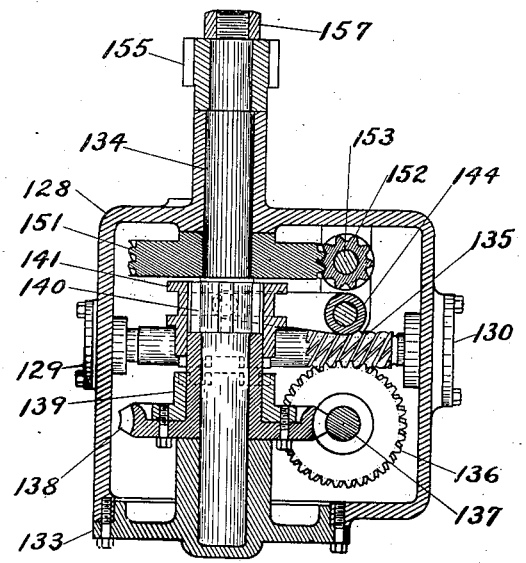
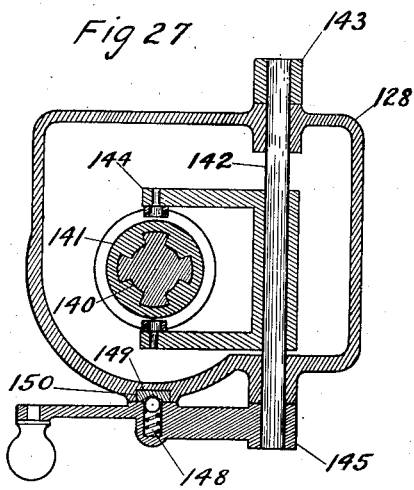

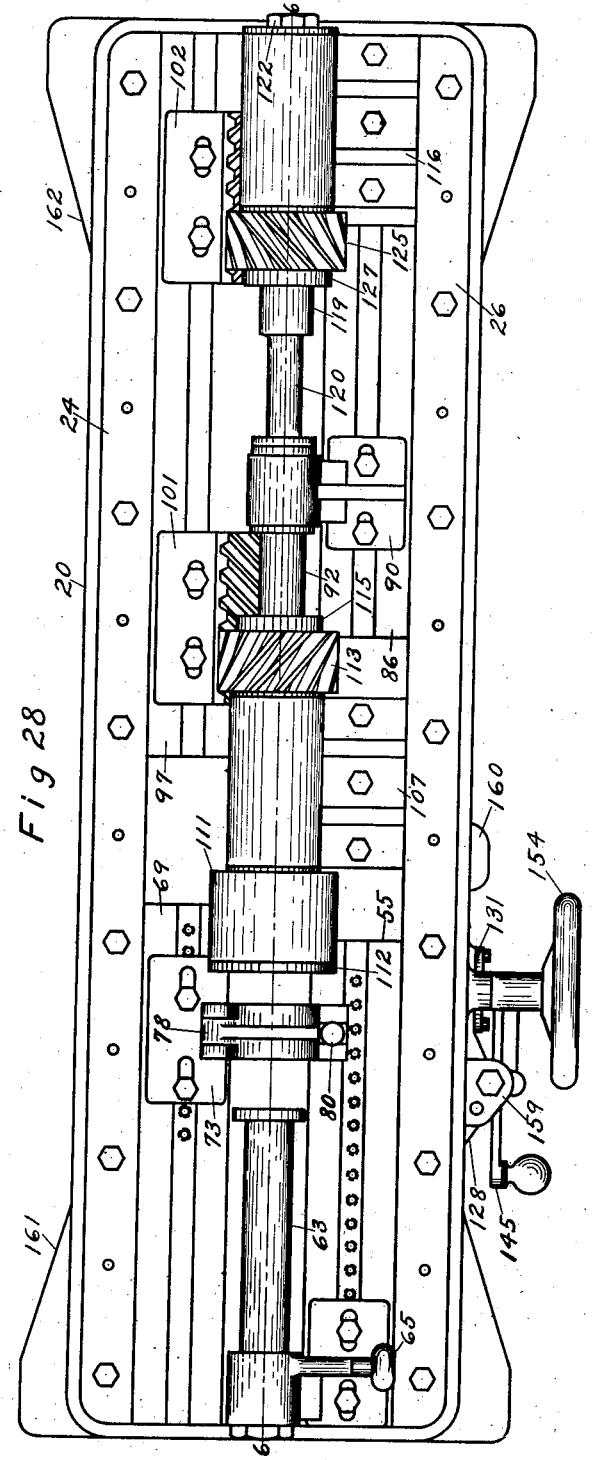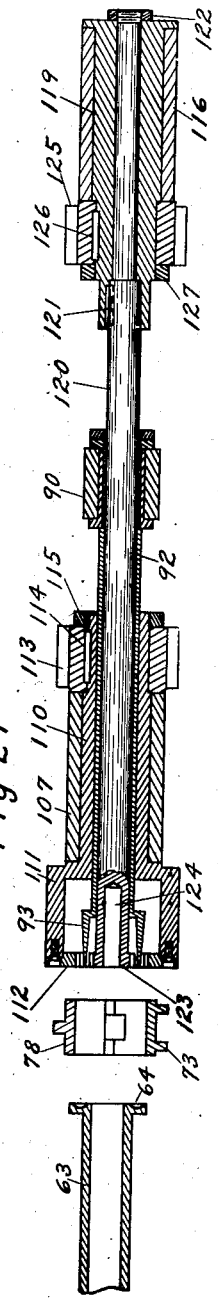

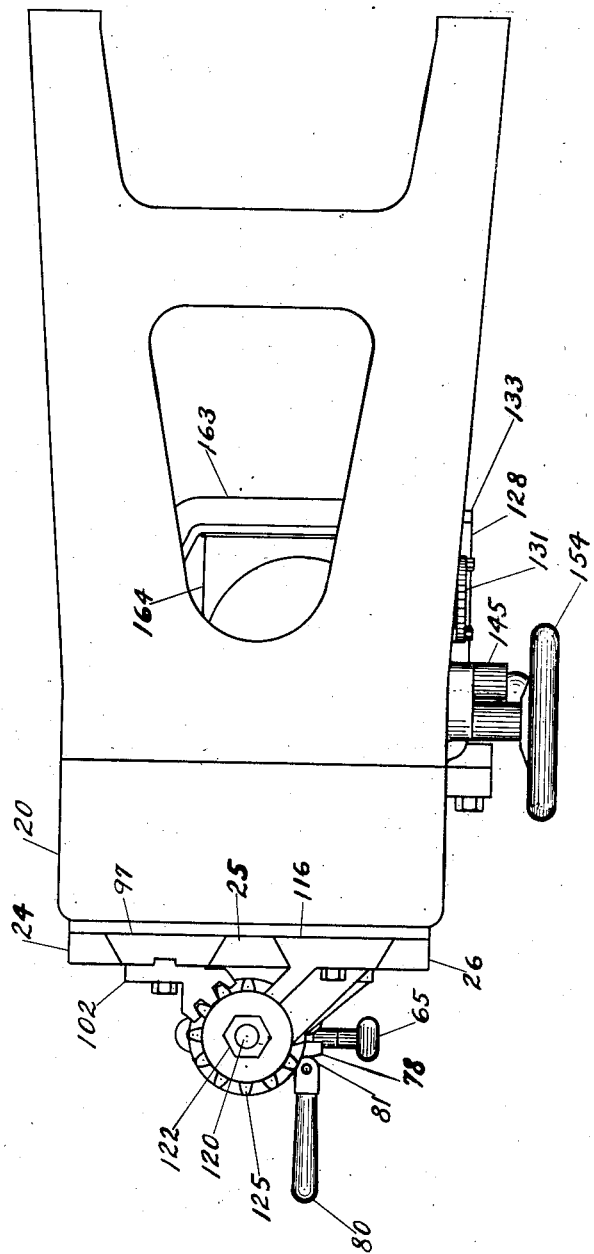

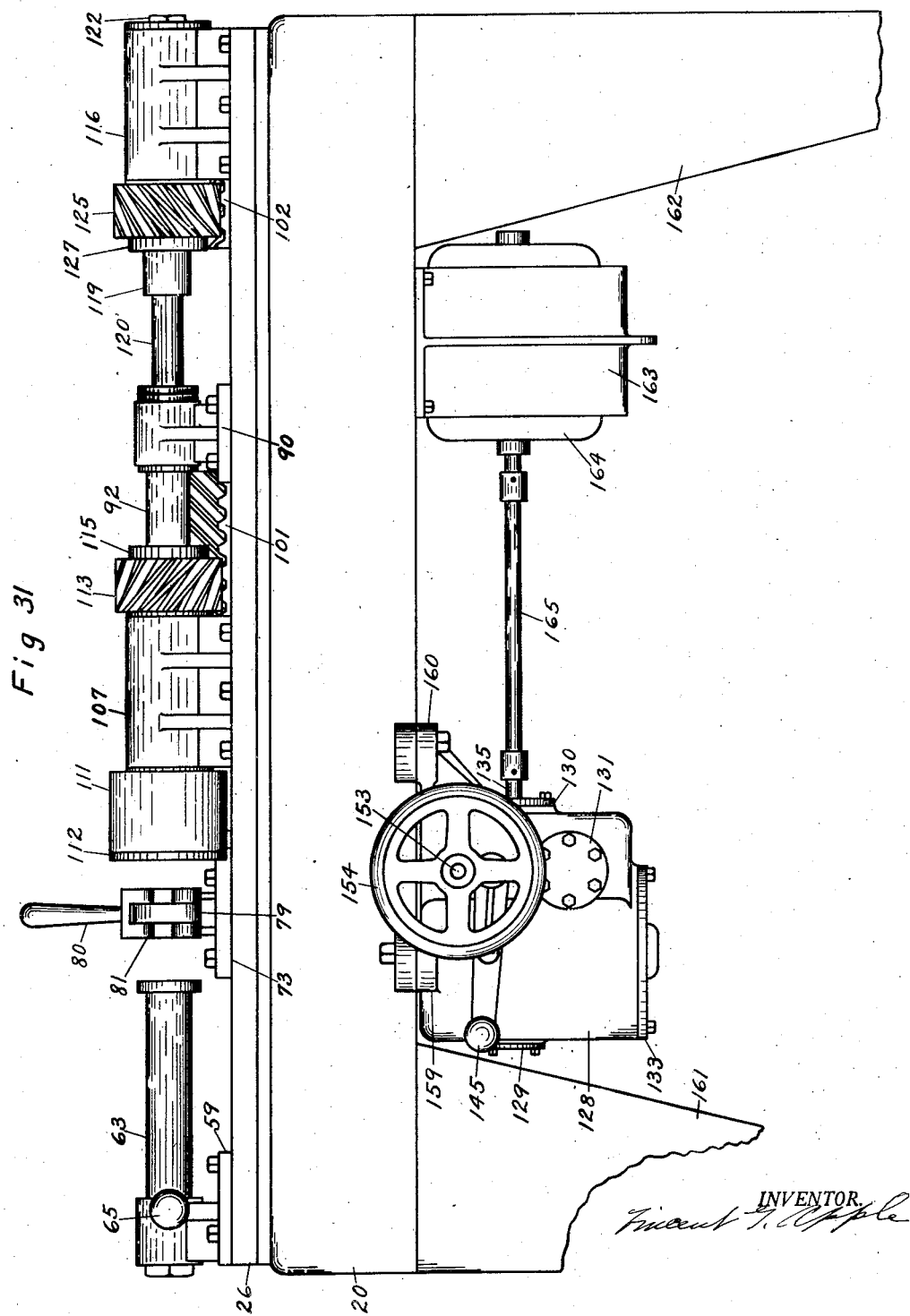

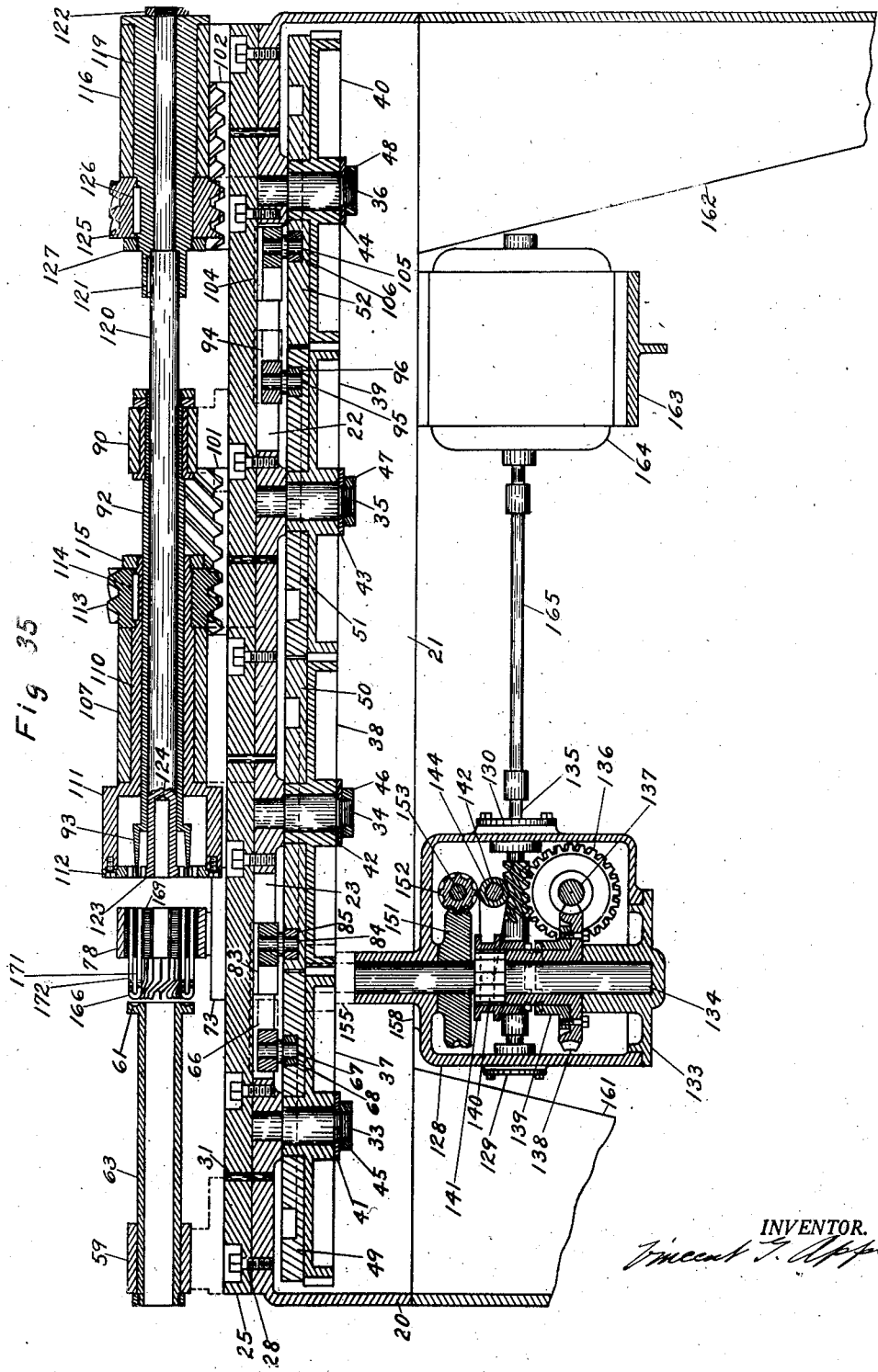

Patented July 7, 1925.

1,544,623

UNITED STATES PATENT OFFICE.

VINCENT G. APPLE, OF DAYTON, OHIO.

MACHINE FOR PRESSING INDUCTORS INTO PLACE ON THE CORE OF DYNAMO-ELECTRIC-MACHINE ELEMENTS AND THEN BENDING THEM SIMULTANEOUSLY.

Application filed November 6, 1922. Serial No. 599,471.   REISSUED

*To all whom it may concern:*

Be it known that I, VINCENT G. APPLE, a citizen of the United States, residing at Dayton, in the county of Montgomery and State of Ohio, have invented certain new and useful improvements in machines for pressing inductors into place on the core of dynamo-electric-machine elements and then bending them simultaneously, of which the following is a specification.

This invention relates to machines for pressing inductors into place on the cores of dynamo electric machine elements and then bending them simultaneously.

One of the objects of my invention is to provide a power driven tool, by means of which a plurality of inductors may be simultaneously pressed into place on the core and then may be simultaneously and uniformly bent into respective positions to form appropriately disposed pairs so that the terminals of the inductors may be joined together for completing a circuit, and which can be connected to commutator segments, or the inductors themselves may be so disposed as to provide a suitable commutator.

Another object of my invention is to provide a tool, and means for adjusting it, so that the extent to which the terminals are pressed and displaced will be automatically determined to the end that the operation consecutively performed on a series of like elements may quickly and accurately be accomplished, and by making slight adjustments and exchanging some of the minor parts of the machine, any size or type of element within the range of the machine may be operated on.

Bar wound dynamo electric machine elements of the type which this invention is intended to produce, require that the slots in the core be lined with tubular insulators and these must be held in some manner so that they will not be pushed out of the slots when the inductors are pressed into place, and one of the objects of the present invention is to provide a means for holding these insulators against displacement while the inductors are being pressed into position.

In the one embodiment of my present invention I provide a machine into which may be placed an armature with the inductors assembled and started through the slots, and which will automatically and accurately hold the slot insulators in place, press the inductors into position, and bend them simultaneously to a predetermined position relative to their original plane.

Other and further and more specific objects of my invention will become readily apparent, to persons skilled in the art, from a consideration of the following description when taken in conjunction with the drawings, wherein:

Fig. 1 is a plan view of the main frame with cams, cam gears and carriage gibs assembled thereon.

Fig. 2 is an end view of Fig. 1.

Fig. 3 is a front elevation of Fig. 1.

Fig. 4 is a plan view of the push-in carriage.

Fig. 5 is an end view of the push-in carriage.

Fig. 6 is a front elevation of the push-in carriage.

Fig. 7 is a plan view of the clamping carriage.

Fig. 8 is an end view of the clamping carriage.

Fig. 9 is a front elevation of the clamping carriage.

Fig. 10 is a plan view of the separator carriage.

Fig. 11 is an end view of the separator carriage.

Fig. 12 is a front elevation of the separator carriage.

Fig. 13 is a plan view of the twisting carriage.

Fig. 14 is an end view of the twisting carriage.

Fig. 15 is a front elevation of the twisting carriage.

Fig. 16 is a plan view of the twisting heads assembled.

Fig. 17 is an end view of the twisting heads assembled.

Fig. 18 is a front elevation of the twisting heads assembled.

Fig. 19 is a section taken on line 1—1 of Fig. 16.

Fig. 20 is another end view of the twisting heads assembled.

Fig. 21 is a plan view of the transmission assembled.

Fig. 22 is an end view of the transmission assembled.

Fig. 23 is a front elevation of the transmission assembled.

Fig. 24 is a section taken on line 2—2 of Fig. 21.

Fig. 25 is a section taken on line 3—3 of Fig. 21.

Fig. 26 is a section taken on line 4—4 of Fig. 21.

Fig. 27 is a section taken on line 5—5 of Fig. 23.

Fig. 28 is a plan view of the complete machine.

Fig. 29 is a section taken on line 6—6 of Fig. 28.

Fig. 30 is an end view of the complete machine.

Fig. 31 is a front elevation of the complete machine.

Fig. 32 shows an armature as it comes from the machine.

Fig. 33 shows an armature after the inductors are pressed into place.

Fig. 34 shows the state of an armature when it is placed in the machine.

Fig. 35 is a vertical central longitudinal section of the complete machine.

Referring more particularly to Figs. 1, 2 and 3, a box-like frame 20 is open at the bottom, as at 21. Two irregular openings are also cut through the top, as at 22 and 23. Three beveled gibs 24, 25 and 26 are securely fastened to the top of the frame 20, with screws 27, 28, 29, etc. and dowel pins 30, 31, 32, etc. Four studs 33, 34, 35 and 36 are firmly fastened in the upper part of the frame and extend downward. Gears 37, 38, 39 and 40 are placed free-to-revolve on the studs. Washers 41, 42, 43 and 44 and nuts 45, 46, 47 and 48 serve to keep the gears in place on the studs. On the top surface of gears 37, 38, 39 and 40 are fastened, by any suitable means, box cams 49, 50, 51 and 52. The beveled openings 53 and 54, which are formed by the junction of gibs 24, 25 and 26 with the frame 20, provide suitable guides in which the carriages may travel. The carriage will be described hereinafter.

It will be readily seen that if slidable carriages are placed in openings 53 and 54 and a connection is made between the carriages and the cams 49, 50, 51 and 52 through openings 22 and 23, the carriages may be operated back and forth in any manner desired, depending on the shape of the grooves in cams 49, 50, 51 and 52. As all four gears 37, 38, 39 and 40 are in mesh, it is apparent that if a single pinion is meshed with any one of the gears it will be sufficient to drive all of them.

The self-contained transmission, having a pinion for driving the gears, will be described hereinafter.

Referring more particularly to Figs. 4, 5 and 6, a rectangular plate 55 has its edges beveled, as at 56 and 57, and has a groove 58 cut the entire length in its top surface. A bracket 59 is tongued to fit groove 58, and is bolted to the top surface of plate 55. By reason of oval slots, as at 60, in the base of the bracket, the bolts may be loosened and the bracket adjusted lengthwise with the plate. Other holes, as at 61 and 62, may be tapped, or a plurality of holes may extend the entire length of plate 55, so that the bracket 59 may occupy any position within the length of plate 55. By this adjustment armatures of any length may be operated upon within the scope of the machine. Bracket 59 is bored to receive hollow tube 63 which is slidable in the bracket. A circular groove 64, in the flanged end of hollow tube 63, fits over the rounded ends 166, Fig. 34, of the inductors, and serves as a guide when pushing the inductors into place. A hand operated plunger 65 may be withdrawn to permit the hollow tube 63 to be moved through the bore of the bracket. The use of the hand-operated plunger will be found necessary only when the armature has a long shaft, as at 167, Fig. 34, but when the armature has a short shaft, or when it is built on a tube which receives a shaft, as at 168, Fig. 33, then the machine may be operated without the use of the hand plunger 65, leaving the tube always in the position in which it is shown in the drawings. On the bottom of rectangular plate 55 is securely bolted a plate 66 which supports stud 67 and roller 68.

For convenience of description we will now call the parts shown assembled in Figs. 4, 5 and 6 the push-in carriage. It is readily apparent that if this carriage is mounted in the bevel-edged opening 54, Fig. 2, and the roller 68 is in position in the groove of cam 49, Fig. 1, that the push-in carriage may be automatically moved back and forth, or made to stand stationary, by properly proportioning the groove in cam 49.

Referring more particularly to Figs. 7, 8 and 9, a rectangular plate 69 has its edges beveled, as at 70 and 71, and has a groove 72 cut the entire length in its top surface. A bracket 73 is tongued to fit groove 72, and is bolted to the top surface of the plate. By reason of oval slots, as at 74, in the base of the bracket, the bolts may be loosened and the bracket adjusted lengthwise with the plate. Other holes, as at 75 and 76, may be tapped, or a plurality of holes may extend the entire length of the plate 69 so that the bracket 73 may occupy any position within the length of plate 69. By this adjustment any armature may be operated upon, the length of whose inductors are within the scope of the machine. Hinged upon bracket 73 by hinge pin 77 is a lid 78. Connected to bracket 73 by link 79 is a handle 80 with an eccentrically rounded end 81. It is obvious that if the handle 80 is brought to a horizontal position instead of the vertical position it occupies in Fig. 8, the clamping action of the eccentric end 81 will be relieved so that the link 79 may be swung clear to allow the lid 78 to be raised, thus permitting the armature to be removed from, or inserted into, the opening 82. On the bottom of rectangular plate 69 is securely bolted a plate 83, which supports stud 84 and roller 85.

For convenience of description we will now call the parts assembled in Figs. 7, 8 and 9 the clamping-head carriage. It is readily apparent that if this carriage is mounted in the bevel-edged opening 53, Fig. 2, and the roller 85 is in position in the groove of cam 50, Fig. 1, that the clamping-head carriage may be automatically moved back and forth, or made to stand stationary, by properly proportioning the groove in cam 50.

Referring more particularly to Figs. 10, 11 and 12, a rectangular plate 86 has its edges beveled, as at 87 and 88, and has a groove 89 cut lengthwise in its top surface. A bracket 90 is tongued to fit groove 89, and is bolted to the top surface of the plate. By reason of oval slots, as 91, in the base of the bracket, the bolts may be loosened and the brackets adjusted lengthwise with the plate. Bracket 90 is bushed to fit hollow tube 92 which has its end cupped, as at 93. The cup 93 is of such dimensions that when presented to the end of armature core at 169, Fig. 34, and the inductors are pushed through, as shown at 170, Fig. 33, the inner row of inductor leads 171, Fig. 33, will enter the inside of cup 93, and the outer row of inductor leads 172, Fig. 33, will go over the outside of cup 93, and inasmuch as the cup is caused to remain presented to the end of the armature core while the pressing-in is taking place, it supplies a means of keeping the tubular insulators from sliding out of the armature slots while the inductors are being pushed in; and as the bending of the inductors takes place, also, with the walls of cup 93 occupying the space between the inner and outer inductor leads 171 and 172, it follows that when the bending is accomplished there will be a space between the inner row of leads 171 and the outer row of leads 172 after the cup is withdrawn. As it is necessary, in armatures of this type, to have the inner and outer rows of inductor leads insulated from each other, the space left by the cup may be replaced with a band of insulating material to insure their proper spacing. On the bottom of rectangular plate 86 is securely bolted a plate 94 which supports stud 95 and roller 96.

For convenience of description, and inasmuch as cup 93 separates the inner and outer rows of leads, we may now call the parts assembled in Figs. 10, 11 and 12, the separator carriage. It is readily apparent that if this carriage is mounted in the bevel-edged opening 54, Fig. 2, and the roller 96 is in position in the groove of cam 51, Fig. 1, that the separator carriage may be automatically moved back and forth, or made to stand stationary, by properly proportioning the groove in cam 51.

Referring more particularly to Figs. 13, 14 and 15, a rectangular plate 97 has its edges beveled, as at 98 and 99, and has a groove 100 cut lengthwise in its top surface. Brackets 101 and 102 are tongued to fit groove 100 and are bolted to the top surface of the plate. By reason of oval slots, as 103, in the base of the brackets, the bolts may be loosened and the brackets adjusted lengthwise with the plate. Bracket 101 has rack-teeth cut in its upper surface, at the proper angle, to mesh with a right-hand helical gear, and bracket 102 has rack-teeth cut in its upper surface, at the proper angle, to mesh with a left-hand helical gear. The helical gears and the spindles upon which they are mounted will be hereinafter described.

It can be readily seen that if the brackets 101 and 102 are moved simultaneously in the same direction, and if gears, with which they are meshed, are on spindles running lengthwise with the machine, that the spindles will be rotated, one in one direction and the other in the opposite direction. On the bottom of rectangular plate 97 is securely bolted a plate 104 which supports stud 105 and roller 106.

For convenience of description we will now call the parts assembled in Figs. 13, 14 and 15 the twisting carriage. It is apparent that if this carriage is mounted in the bevel edged opening 53, Fig. 2, and the roller 106 is in position in the groove of cam 52, Fig. 1, that the twisting carriage may be automatically moved back and forth, or made to remain stationary, by properly proportioning the groove in cam 52.

Referring more particularly to Figs. 16, 17, 18, 19 and 20, a bracket 107 has its edges beveled, as at 108 and 109, and forms a bearing for tubular spindle 110 which is enlarged at its front end 111 and is drilled and tapped to support slotted twisting plate 112, which is slotted on its inside diameter to fit the outer row of inductor terminals 172, Fig. 33. On the opposite end of tubular spindle 110 is mounted a right-hand helical gear 113, fastened by key 114 and held on by nut 115. The slotted twisting plate 112 is made to rotate by gear 113 through spindle 110. Bracket 116 has its edges beveled, as at 117 and 118, and forms a bearing for tubular spindle 119 which is bored to fit twisting shaft 120. A key, 121, connects shaft 120 to tubular spindle 119 and nut 122 helps to hold the shaft and spindle together. The front end of shaft 120 is enlarged to form a disc, as at 123. This disc is slotted on its outside diameter to fit the inner row of inductor-terminals 171, Fig. 33. A hole, 124, is bored in the end of shaft 120 to clear the short end of the armature shaft 173, Fig. 34. Near one end of the tubular spindle 119 is mounted a left-hand helical gear 125, driven by key 126 and held on by nut 127. The slotted twisting shaft is made to rotate by gear 124 through spindle 119.

For convenience of description we may now call the parts assembled in Figs. 16 to 20 inclusive, the twisting heads.

The twisting heads, Figs. 16 to 20 inclusive, are to be mounted with the beveled edges 108 and 109, 117 and 118, of the brackets 107 and 116, in the opening 54, Fig. 2, and the brackets are to be securely bolted to frame 20, Figs. 1, 2 and 3. The twisting carriage, Figs. 13, 14 and 15, is to be slidably mounted in the opening 53, Fig. 2. It is apparent that if the right and left hand racks 101 and 102, Figs. 13, 14 and 15, are moved forward when in engagement with the right and left hand helical gears 113 and 125, Figs. 16, 18 and 19, that the twisting spindles 110 and 119 will be rotated, one in one direction and the other in the opposite direction.

In Figs. 21 to 27 inclusive, I show a transmission, the purpose of which is to receive the relatively high speed and low torque of a motor or other driving means, and deliver to the machine proper a relatively low speed and high torque, as required, for operating the cam gears shown in Figs. 1, 2 and 3. A further purpose of the transmission is to supply a means of connecting or disconnecting the motive power from the machine proper, manually or automatically, at will. The reduction in speed is accomplished by two worm-and-wheel gears and the disconnecting is accomplished by a toothed clutch on the slow speed shaft.

Referring to the drawings, Figs. 21 to 27 inclusive, a casing 128 is bored in its outer walls to receive ball bearing cups 129, 130, 131 and 132. These cups contain ball bearings for supporting the worm shafts. A large opening in the bottom of the casing 128 permits assembly of the parts within the casing and a plate 133 closes the opening and forms the lower bearing for the slow speed shaft 134.

The motive power is applied to shaft 135 which is journaled at its ends in ball bearings supported by cups 129 and 130. Worm threads are cut on the middle portion, see Fig. 25, and into these threads are meshed the teeth of worm wheel 136. Worm wheel 136 is supported on the unthreaded portion of worm shaft 137 and both are journaled in ball bearings supported in cups 131 and 132, Fig. 26. The threads of worm shaft 137 are meshed with the teeth of worm wheel 138, Fig. 25. Worm wheel 138 is mounted, free to rotate, on shaft 134. A long hub, on the upper side of worm wheel 138, supports a flanged clutch member 139 which is bolted through its flange to the worm wheel 138, Fig. 25.

Into an enlarged portion of shaft 134, as at 140, are cut several keyways, and into these keyways are fitted the integrally cut keys of clutch member 141, so that the clutch member 141 must rotate with shaft 134, but may be axially shifted thereon. See Figs. 25 and 27. Journaled in casing 128 shaft 142 supports lever 143, clutch fork 144 and hand lever 145, Figs. 26 and 27. In the end of lever 143 roller 146 is mounted on stud 147, Fig. 26. Hand lever 145 has, at its middle portion, a cavity-containing spring 148. Spring 148 presses a ball 149 into cup 150, mounted in casing 128, and helps to retain hand lever 145 in a raised position when the clutch is out of engagement. See Fig. 27.

It is apparent that when the power means is continuously operating worms 135 and 137 and wheels 136 and 138, the shaft 134 may be started and stopped at will through clutch members 139 and 141, automatically by lever 143, or manually by lever 145. Above the clutch member 141, on shaft 134, is keyed a helical gear 151 into which meshes a helical pinion 152, Figs. 25 and 26. The helical pinion 152 is mounted on shaft 153. On the outer front end of shaft 153 is mounted a hand-wheel 154. The purpose of hand-wheel 154 is to operate the machine manually, through pinion 152 and gear 151, when clutches 139 and 141 are out of engagement. See Figs. 25 and 26. At the upper end of shaft 134 is mounted pinion 155, driven by key 156 and held on by nut 157.

On the upper surface of casing 128 are pads 158, 159 and 160, through holes of which the transmission is securely bolted to the underside of frame 20, Fig. 1, in such a position that the pinion 155, Fig. 23, will mesh with gear 37, Fig. 1, to operate the cams and carriages, as previously described relative to Figs. 1, 2 and 3.

In Figs. 28, 29, 30 and 31 is shown the complete machine which is operated as follows: An armature, such as is shown in Fig. 34, is securely fastened to the clamping-head carriage, (principal parts of which are 69, 73, 78, 79 and 80, but which is shown more in detail in Figs. 7, 8 and 9,) with its closed ends 166 turned toward spindle 63. By means of hand-wheel 154 the clamping head carriage is moved to present the surface of the core 169 against the slotted twisting plates 112 and 123, Figs. 29, 19 and 20. A slightly further turn of the hand-wheel 154 moves forward the push-in carriage, parts 55, 59, 63 and 65, also shown in detail in Figs. 4, 5 and 6, until the circular groove 64, Fig. 29, engages the ends of the inductors 166 and pushes them through the core sufficiently to enter the ends 171, 172, etc., Fig. 33, slightly into the slotted twisting plates 112 and 123, Figs. 29, 19 and 20. After the inductors are safely entered in the slots of the twisting plates, the hand lever 145 may be pushed downward connecting the machine to the power, as shown and described in Figs. 21 to 27 inclusive. The push-in carriage now continues forward until the inductors are pressed home, as in Fig. 33, with the inner row of leads within and the outer row of leads without the cup 93, Figs. 29, 10, 11 and 12. As the power continues the clamping-head and push-in carriages are drawn back, taking the armature with them, and the leads of the armature are withdrawn almost all the way out of the slotted twisting plates.

By means of the separator carriage, composed principally of parts 86, 90 and 92, shown in detail in Figs. 10, 11 and 12, the cup 93, Figs. 29, 10, 11 and 12, is made to follow up the armature as it recedes, extending the circular wall of the cup beyond the face of the twisting plates, thus keeping the outer and inner rows of inductors spaced apart. The power now continues so as to cause the twisting carriage, composed mainly of parts 97, 101 and 102, and in detail in Figs. 13, 14 and 15, to revolve the slotted twisting plates, one in one direction, and the other in the opposite direction, and while this twisting is taking place it is necessary to again move forward slightly the other carriages and the armature because in the final twisted condition the inductor leads 174, Fig. 32, are shorter than the straight leads 170, Fig. 33.

After the above operations are completed, the power continues until all carriages and the twisting plates are in their starting positions, when a lug bolted to one of the cam gears, Fig. 1, will contact with roller 146, moving lever 143, Figs. 21 to 27, inclusive, to stop the machine.

A bracket 163 is bolted to the bottom of the frame 20 to support motor 164 which drives the transmission shaft 135 through connection 165.

To bring the working parts to a convenient height, the frame 20 is mounted on legs 161 and 162.

Having described my invention what I claim is:

1. In a machine for building dynamo electric machine elements, the combination of a core holding means and means to press the partially entered conductors of a core endwise through the slots thereof.

2. In a machine for building dynamo electric machine elements, the combination of a core holding means, means to press the partially entered conductor of a core endwise through the slots thereof and means to hold the insulating linings of the core slots against endwise displacement while the conductors are being endwise entered.

3. In a machine for building dynamo electric machine elements, the combination of a core holding means, means to press the conductors of a core into the slots thereof, two independently rotatable parts, each provided with a plurality of conductor terminal engaging means, and means to move said terminal engaging means to circumferentially displace said conductor terminals.

4. In a machine for building dynamo electric machine elements, the combination of a core holding means, means to press the partially entered conductors of a core endwise through the slots thereof, means to hold the insulating linings of the core slots against endwise displacement while the conductors are being endwise entered, two independently rotatable parts, each provided with a plurality of conductor terminal engaging means, and means to move said terminal engaging means to circumferentially displace said conductor terminals.

5. In a machine for building dynamo electric machine elements, the combination of a core holding means, means to press the conductors of a core into the slots thereof, a rotatable part provided with a plurality of conductor terminal engaging means to receive the terminals of the outer layer of conductors, a rotatable part provided with a plurality of conductor terminal engaging means to receive the terminals of the inner layer of conductors, means to move said terminal engaging means to circumferentially displace said terminals, and means to keep the outer and inner layer of conductor terminals separated while circumferential displacement of the terminals is being effected.

6. In a machine for building dynamo electric machine elements, the combination of a core holding means, means to press the partially entered conductors of a core endwise through the slots thereof, means to hold the insulating linings of the core slots against endwise displacement while the conductors are being endwise entered, a rotatable part provided with a plurality of conductor terminal engaging means to receive the terminals of the outer layer of conductors, a rotatable part provided with a plurality of conductor terminal engaging means to receive the terminals of the inner layer of conductors, means to move said terminal engaging means to circumferentially displace said terminals, and means to keep the outer and inner layer of conductor terminals separated while circumferential displacement of the terminals is being effected.

7. In a machine for building dynamo electric machine elements, the combination of a core holding means, means to press the conductors of a core into the slots thereof, rotatable parts provided with a plurality of conductor terminal engaging means, means to rotate said rotatable parts to circumferentially displace said terminals, means to keep the outer and inner layer of conductor terminals separated and means to change the axial position of the terminal engaging means relative to the core holding means while circumferential displacement is being effected.

8. In a machine for building dynamo electric machine elements, the combination of a core holding means, means to press the partially entered conductors of a core endwise through the slots thereof, means to hold the insulating linings of the core slots against endwise displacement while the conductors are being endwise entered, rotatable parts provided with a plurality of conductor terminal engaging means, means to rotate said rotatable parts to circumferentially displace said terminals, means to keep the outer and inner layer of conductor terminals separated and means to change the axial position of the terminal engaging means relative to the core holding means while circumferential displacement is being effected.

9. A machine having in combination, means for holding the core of a dynamo electric machine element having axially projecting therefrom a plurality of winding terminals; rotatable means for circumferentially displacing the winding terminals, and means to keep the outer and inner rows of winding terminals separated while circumferential displacement is being effected.

10. A machine having in combination, means for holding the core of a dynamo electric machine element having axially projecting therefrom a plurality of winding terminals; power means for circumferentially displacing the winding terminals and means to keep the outer and inner rows of winding terminals separated while circumferential displacement is being effected.

11. A machine having in combination, means for holding the core of a dynamo electric machine element having axially projecting therefrom a plurality of winding terminals; means for circumferentially displacing the winding terminals; means to keep the outer and inner rows of winding terminals separated while circumferential displacement is being effected, and means to axially shift the armature core holding means and terminal separating means as required in relation to the circumferentially displacing means.

12. A machine having in combination, means for holding the core of a dynamo electric machine element having axially projecting therefrom a plurality of winding terminals; means for circumferentially displacing the winding terminals; means to keep the outer and inner rows of winding terminals separated while circumferential displacement is being effected; power means for performing the whole cycle of operations and means to automatically disconnect the power means when the cycle of operations is completed.

13. A machine for making a bar wound dynamo electric machine element having a core with slots containing insulators, the combination with means for pressing a plurality of inductors through the core slots and means for holding the insulators against displacement while the inductors are being pressed through the slots.

14. A machine for making a bar wound dynamo electric machine element having a slotted core, the combination with means for pressing a plurality of inductors simultaneously through the core slots and means for displacing the ends of the inductors circumferentially to provide for commutation.

15. A machine for making a bar wound dynamo electric machine element having a core with slots containing insulators, the combination with means for pressing a plurality of inductors, simultaneously through the core slots, means for holding the insulators against displacement while the inductors are being pressed through the slots, and means for displacing the ends of the inductors circumferentially to provide for commutation.

16. A machine for making a bar wound dynamo electric machine element having a core with slots containing insulators, the combination with means for pressing a plurality of inductors simultaneously through the core slots, means for holding the insulators against displacement while the inductors are being pressed through the slots, means for displacing the ends of the inductors circumferentially to provide for commutation and means to keep the outer and inner rows of inductor ends separated while circumferential displacement is being effected.

17. In a machine for building dynamo electric machine elements, the combination of a frame, carriages endwise movable on said frame, a core holding means mounted on one carriage, a means to press the partially entered conductors of a core endwise through the core slots mounted on another carriage, a means to hold the insulating linings of the core slots against endwise displacement mounted on another carriage, rotatable parts having a plurality of conductor terminal engaging means mounted on said frame, means to rotate said rotatable parts to circumferentially displace said conductor terminals mounted on another carriage, means to operate the carriages endwise on the frame, manual and power means to operate the carriage operating mechanism, means to manually engage or disengage the power means, and means to automatically disengage the power means at the completion of each cycle of operations.

18. In a machine for building dynamo electric machine elements, the combination of a core holding means, power means to press the partially entered conductors of a core endwise thru the slots thereof, manual means to connect said power means to said pressing means and automatic means to disconnect said power means from said pressing means after said conductors are entered in said core.

In testimony whereof I hereunto set my hand this 1st day of Nov., 1922.

VINCENT G. APPLE.